United States Patent [19]

Scharfenberger

[11] 3,930,061

[45] Dec. 30, 1975

[54] ELECTROSTATIC METHOD FOR FORMING STRUCTURES AND ARTICLES

[75] Inventor: James A. Scharfenberger, Indianapolis, Ind.

[73] Assignee: Ransburg Corporation, Indianapolis, Ind.

[22] Filed: Apr. 8, 1974

[21] Appl. No.: 459,059

[52] U.S. Cl. .................. 427/27; 239/3; 264/24; 264/309; 427/196; 427/426
[51] Int. Cl.² .......................................... B05D 1/06
[58] Field of Search ............ 117/93.4, 93.41, 93.42, 117/93.43, 93.44, 105.5; 239/3, 15; 264/24, 257, DIG. 53, 309; 118/315, 316, 621, 627, 629; 427/27, 33, 426, 196

[56] References Cited
UNITED STATES PATENTS

| | | | |
|---|---|---|---|
| 2,466,906 | 4/1949 | Miller | 117/93.44 |
| 2,933,125 | 4/1960 | Anderson | 118/316 |
| 3,033,472 | 5/1962 | Shelton | 117/105.5 |
| 3,129,112 | 4/1964 | Marvin | 117/93.4 R |
| 3,249,304 | 5/1966 | Faro et al. | 117/105.5 |
| 3,251,551 | 5/1966 | Walberg | 117/93.4 R |

*Primary Examiner*—J. H. Newsome
*Attorney, Agent, or Firm*—Merrill N. Johnson

[57] ABSTRACT

An electrostatic method for forming structures from plural component materials includes the formation of a liquid resin into spray particles at one location, the formation of a liquid curing agent into spray particles at another location, and the establishment of an electrostatic field adjacent these locations to enhance mixing of the resin and curing agent particles and deposition of the mixture on a substrate to solidify and form a structure. The electrical conductivity of the liquid resin and liquid curing agent can be adjusted to enhance the mixing and electrostatic deposition and to provide a method of employing an electrically non-conductive substrate on which the structure can be formed.

13 Claims, 4 Drawing Figures

ELECTROSTATIC METHOD FOR FORMING STRUCTURES AND ARTICLES

This invention relates to electrostatic method and apparatus for forming plastic structures and articles.

Present methods of manufacture of articles frequently include their formation from a plurality of reactive chemical components. Such plural component materials include polyester resins, epoxy resins, urethane resins, silicone rubber, and other such plural component materials which include a resinous material and a curing agent or catalyst material that, when mixed with the resin, will cause it to convert from a liquid phase to a solid phase. Of these materials, polyester resins have found a greater use than the others in the formation of such large articles as boats, structural building panels and bathroom fixtures. In working with polyester materials, a polyester resin, a catalyst and a promoter must be mixed in order to attain an end product that cures properly and will harden in a reasonable time.

Probably the most commonly used method for formation of such articles with plural component materials is the mixing and spraying of the plural component materials onto a mold form on which it hardens to form the article. These methods and apparatus include the use of spray guns in which the plural component materials are mixed internally of the spray gun and are subsequently atomized and directed onto the article as, for example, shown in U.S. Pat. No. 3,330,484 and U.S. Pat. No. 3,579,450. These methods and apparatus also include the use of spray agents in which plural component materials are mixed externally of the spray gun as, for example, shown in U.S. Pat. No. 3,399,834.

In this method and with both internal mix and external mix apparatus as shown in the above patents, the plural component material can be deposited with chopped lengths of glass fibers which are mixed into the spray prior to deposition. In addition, U.S. Pat. No. 3,676,197 shows an apparatus for and a method of mixing granular material entrained in a gaseous medium with sprays of liquid plural component material and depositing the resulting mixture on the surface of an article.

In the manufacture of large articles by this method, solid particles, such as glass fibers and particulate matter, are frequently introduced into the catalyzed resin while it is in the liquid phase to alter the physical characteristics of the material in the resulting article or to simply save resins. Such particulate materials, for example, can impart low density, low thermal conductivity, greater rigidity, low thermal expansion, greater buoyancy and reduced shrinkage to the material making up the resulting article, as well as saving the relatively expensive plural component materials.

Electrostatic methods and apparatus are particularly known in the coating art. Examples of methods and apparatus which have been developed for the electrostatic deposition of coating materials on an article are those shown in U.S. Pat. Nos. 3,169,882 and 3,169,883 and Canadian Pat. No. 876,063. Apparatus employing the inventions of these patents have been in use in industrial electrostatic coating for many years.

This invention includes a method of forming a plural component structure with electrostatic deposition by forming resinous material into a spray at one site, and establishing an electrostatic field from a charging electrode adjacent to that site to charge the resin spray with one charge, and simultaneously forming a curing or catalyst agent material for the resinous material into a spray at another site which acts as a terminus of at least a portion of the electrostatic field from the charging electrode. The catalyst spray may thus be formed so that it is attracted to the resin spray. By projecting the charged sprays of resin and catalyst from their sites of formation so that they converge, this use of electrostatics enhances their mixing and electrostatic deposition on the surface on which the article or structure is to be formed. Atomization of the resin and curing agent, or catalyst, materials in this method and apparatus may be accomplished airlessly by the use of hydraulic pressure or by the use of compressed air.

By this method the spray of resinous material and curing agent material are urged together so that little catalyst escapes mixing with the resinous material. Because of the greater volume of charged resinous material, the resulting mixed spray of resin and catalyst carries an electrostatic charge for electrostatic deposition upon the article to be coated.

Preferably, a highly ionized zone is created adjacent the charging electrode and the ions created in this zone are attracted across the path of the resin spray to the site of formation of the catalyst spray. In this preferred method, greater charging of the resin spray is obtained because of the increased likelihood of collisions between resin spray particles and ions. Catalyst particles are charged by virtue of the conductivity of the catalyst material and by the catalyst material being at a terminus of the electrostatic field from the charging field, the site of formation of the catalyst spray being preferably maintained at ground potential. Reduction of the number of ions from the highly ionized zone reaching the site of formation of the catalyst spray results in a more effective charging of the catalyst to a polarity opposite to that of the charging electrode.

In the method of this invention, fibrous insulating material, such as glass fibers, may be cut into lengths in the order of an inch or less and triboelectrically charged in cutting so that they are electrostatically urged into the charged resin spray and are wetted by catalyzed resin material.

Apparatus of this invention for forming a plural component structure includes a first means to atomize and form a spray of resinous material, and a second means to atomize and form a spray of catalyst material. A third means creates an electrostatic field to the second means and to the substrate to be coated. These three means are so related with respect to each other that the sprays of resin and catalyst are charged to enhance both their mixing and deposition on the substrate. The three means can be incorporated into one body which carries a first atomizer connected with the source of resin material and second atomizer connected with a source of catalyst material. A charging electrode carried by the body adjacent the first atomizer can be connected with the output of a high voltage source and the second atomizer can be connected to ground in a configuration so that the electrostatic field from the charging electrode is made more effective in charging the sprays.

With many plural component materials it may be advisable to adjust the electrical conductivity of the resin and catalyst by the inclusion of conductive solvents. In the preferred embodiment of the invention, it is more important that the catalyst have a higher electrical conductivity than the resin in order that it may act as a terminus of the electrostatic field from the charging electrode.

Molds are frequently made from electrically nonconductive polyester resins, or "tooling gels", as they are called in the art. Such nonconductive molds present a problem in trying to electrostatically deposit charged plural component material in that accumulation of electric charge on the nonconductive surface of the mold inhibits deposition. Proper adjustment of the electrical conductivity of the resin and catalyst mixture will impart sufficient electrical conductivity to the coating of catalyzed resin deposited upon such nonconductive molds that the liquid coating itself may carry away the electrostatic charge reaching the mold by operation of this method and apparatus. The method and apparatus of this invention may thus be practiced with electrically nonconductive molds if the deposition of such a conductive, catalyzed resin begins at a grounded connection of such a mold surface and proceeds in such a manner that the liquid path between the area of deposition of the charged, catalyzed resin spray and the grounded connection remains unbroken until the mold is coated. Electrostatic deposition of the catalyzed resin material and any entrained particulate or fiber materials can continue at the boundary between the coated and the uncoated mold surface even though the mold is made of nonconductive material.

In instances where unskilled labor must be used, or a difficult configuration is encountered, and it is not possible to conveniently practice the spray deposition method just described, the mold itself can be supplied with sufficient electrical conductivity to permit electrostatic deposition as disclosed in U.S. Pat. Nos. 3,236,679 and 3,644,132.

A more detailed description of the invention follows with respect to the drawings of this application, and other features of the invention will be apparent from this description.

Figure 1:
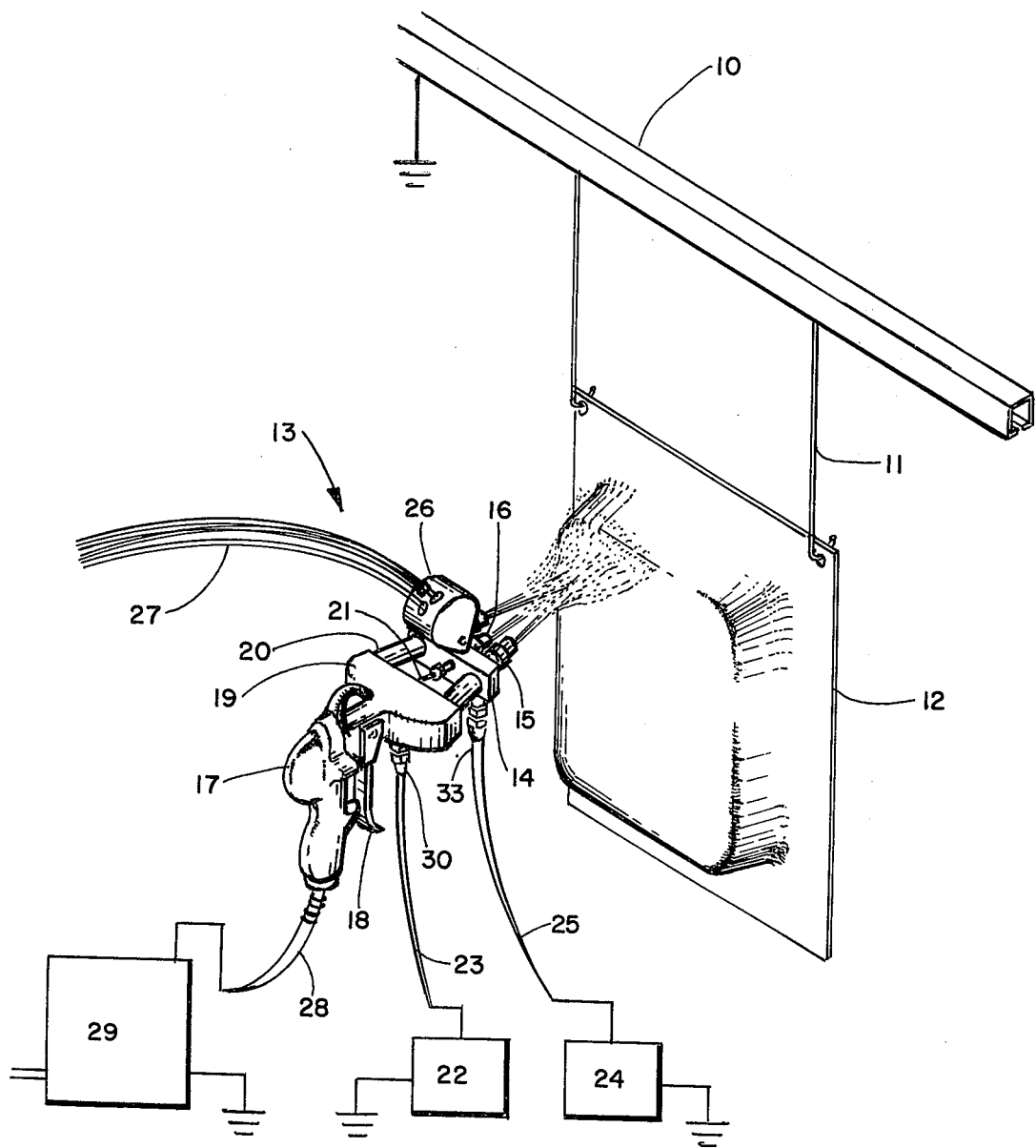
FIG. 1 is a perspective view of the system utilizing the invention of this application.
Figure 2:
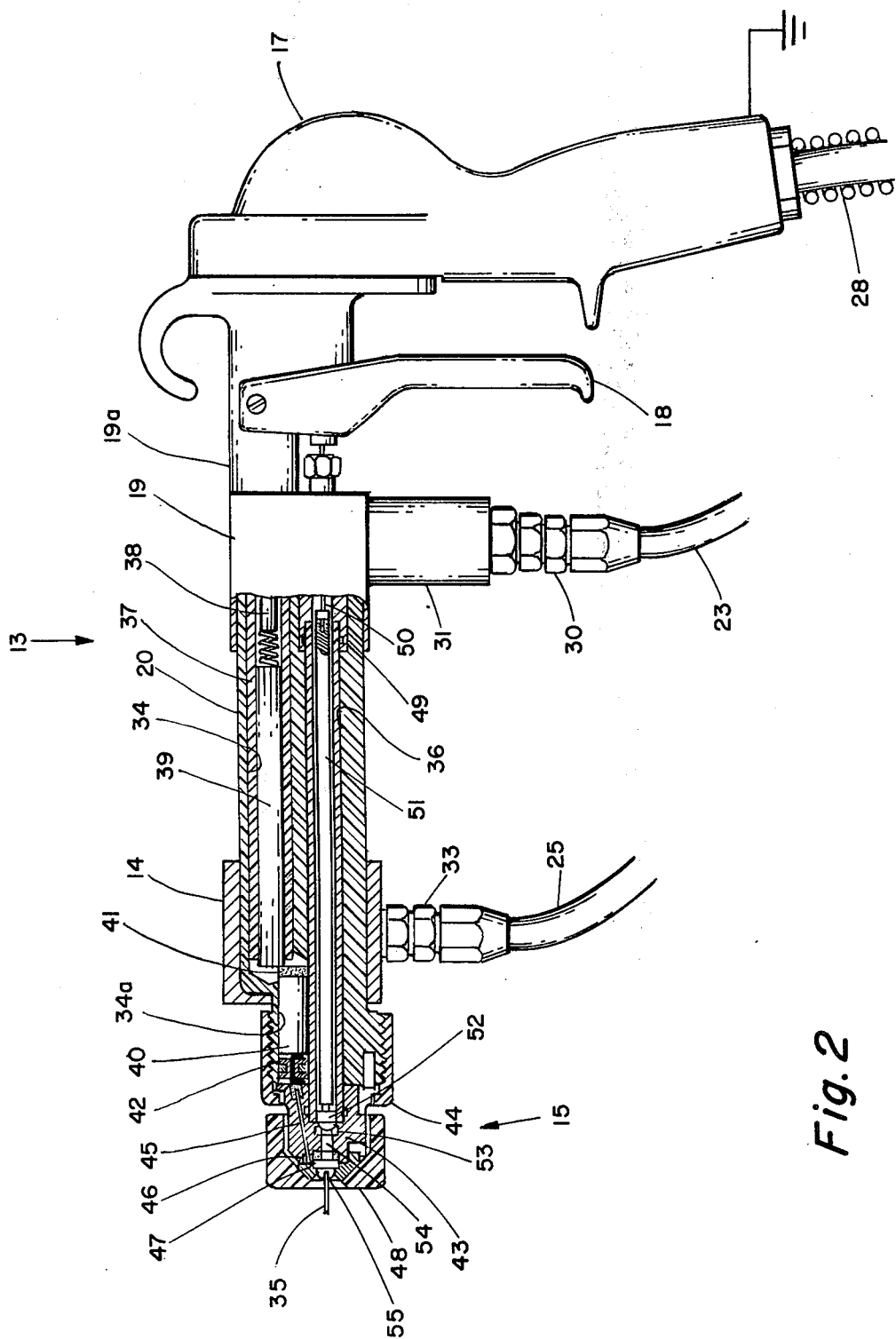
FIG. 2 is a longitudinal view of the apparatus of FIG. 1 without the fiber cutter and with a partial cross-section to illustrate the forwardmost portion of a resin atomizer and charging electrode of the system of FIG. 1.
Figure 3:
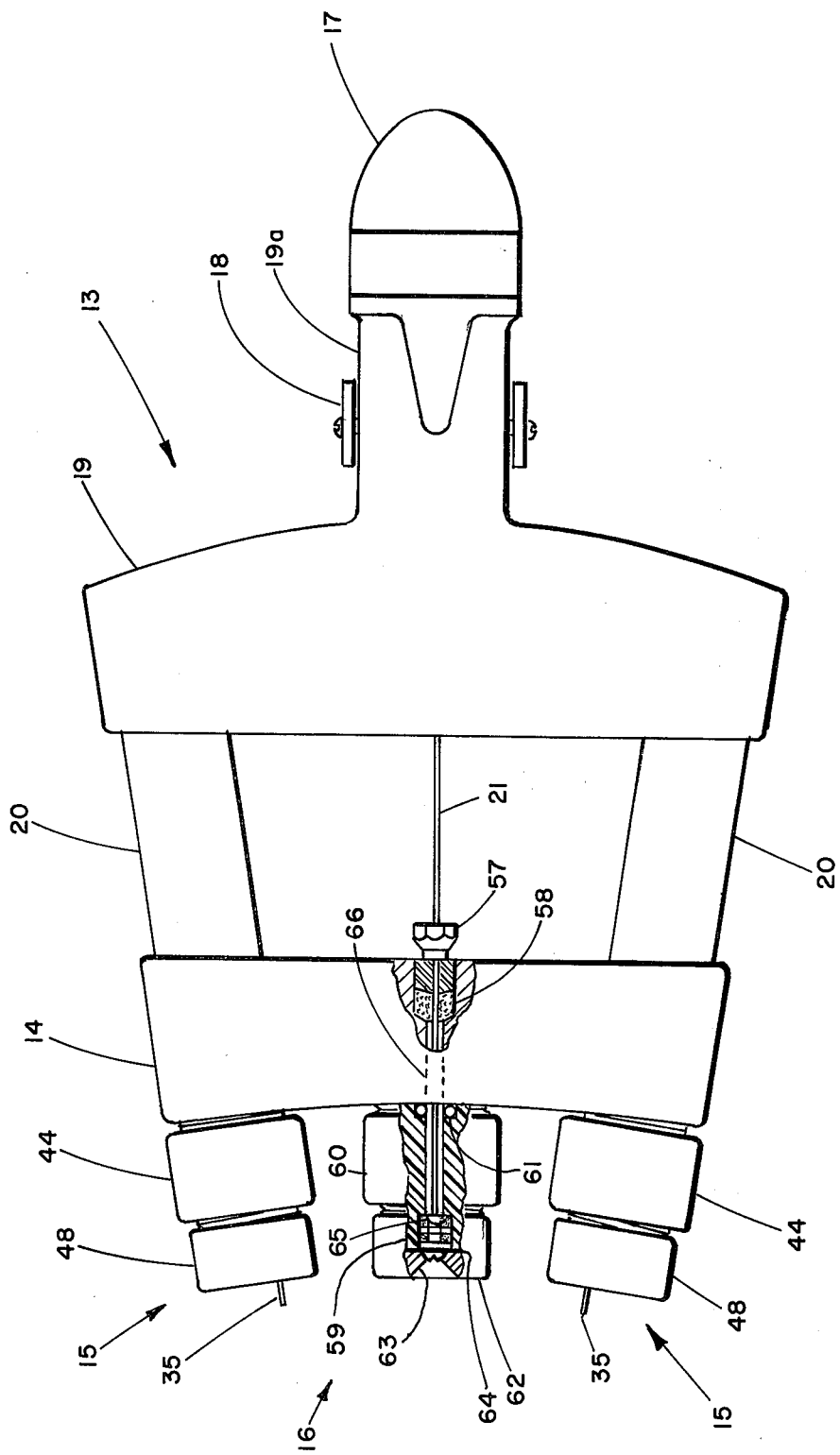
FIG. 3 is a top view of the apparatus of FIG. 2 (without a fiber cutter) with the catalyst atomizer shown in greater detail by a partial cross-sectional view.

Referring now to the particular embodiment illustrated in FIGS. 1–3 of the drawings, the conveyor track 10 provides an enclosure within which a conveyor chain slides. This chain is longitudinally moved by suitable conveyor drive means (not shown). The conveyor is provided with hangers 11 as illustrated, from which a polished steel mold form 12 is suspended. This mold is shown as formed, for example, to permit the manufacture of bathroom sink basins. The conveyor is grounded and thus the polished steel mold form 12 is maintained at ground potential by contact between the hooks 11 and the conveyor 10. The mold form 12 is coated using the method and apparatus of this invention.

FIG. 1 illustrates a system utilizing the method and apparatus of this invention. Apparatus embodying this invention is indicated generally at 13 having a forward portion including an electrically nonconductive body 14 supporting two airless electrostatic resin atomizers 15 at spaced-apart sites on body 14. An airless atomizer 16 carried by body 14 intermediate the resin atomizers 15 is provided to spray the curing agent or catalyst. Apparatus 13 also includes a handle portion 17 including a trigger 18 and a rear support body 19. The handle, trigger and rear support body 19 are all made of metal. Extending between body 14 and the rear support body 19 are nonconductive barrels 20 carrying the high voltage connections to the charging electrodes (not shown in this figure) adjacent the airless resin atomizers. Insulating barrels 20 also contain passageways for the promoted resin material and actuators for the valves adjacent the airless atomizers 15. Also extending between body 14 and the rear support body 19 is an actuator 21 for the valve adjacent airless atomizer 16 for controlling the supply of catalyst. A fiber glass cutter 26 like that shown in U.S. Pat. No. 3,763,561 is mounted on body 14 of the apparatus embodiment shown in FIG. 1.

In operation a promoted resin material is pumped by suitable pump 22 under high pressure, for example on the order of 300 to 3000 pounds per square inch, through hose 23 to the rear support member 19 of the apparatus where it is distributed to the passageways of the two insulating barrel portions 20 for delivery to the resin atomizers 15. The pressure of the coating material supplied from pump 22 depends to some extent upon the physical characteristics of the resin material, the nature of the atomizing orifice, and the like.

Curing agents or catalyst is likewise pumped from a source 24 through a hose 25 at relatively high pressure, for example 30–100 p.s.i., to a fitting on body 14 and through passageways in body 14 to airless atomizer 16.

One or more strands of fiber glass 27 may be provided to fiber glass cutter 26. Compressed air is delivered to the fiber glass cutter from a source (not shown) to drive an air motor operating the cutter mechanism.

The charging electrodes (shown in FIGS. 2-4) adjacent the resin atomizers 15 are connected through insulating barrel members 20 and the rear portion of the gun with a high voltage cable 28 to a source of high voltage 29. The source of high voltage is grounded and generates between ground and the high voltage cable 28, a voltage on the order of 60,000 volts. As described with respect to FIG. 2, voltage from the high voltage source is connected within apparatus 13 to the charging electrodes to practice this invention.

In operation trigger 18 is pulled thereby operating an electric switch within handle 17 and turning on high voltage supply 29 and a flow of compressed air for the fiber glass cutter 26 by means of control wire connections within the cable 28. Simultaneously with the generation of high voltage, the trigger opens the valves within the insulating barrel member 20 and body 14 and permits a flow of promoted resin from source 22 to atomizers 15 and a flow of catalyst from source 24 to atomizer 16. The promoted resin and catalyst are broken into a spray of fine particles airlessly by interaction with the atmosphere.

Where polyester resin is used, source of resin 22 may contain a mixture of polyester resin and cobalt naphthanate as a promoter. The catalyst material used with the promoted polyester resin could be undiluted methyl ethyl ketone peroxide. Where such materials are used with apparatus 13, two spray streams of promoted polyester resins issue from airless nozzles 15, which are directed by their mounting on body 14 to commingle forwardly of the apparatus. The spray patterns from nozzles 15 are in a form commonly referred to as "fan-shaped" or elliptical. The airless atomizer 16, intermediately spaced between atomizers 15, ejects a spray of methyl ethyl ketone peroxide into the intersection of the promoted resin sprays. The intersection of the sprays occurs at a distance of about six inches forwardly of the apparatus. The spray ejection of catalyst into the crossfire of promoted resin sprays at about the locus of the intersection of the sprays from the resin atomizers traps the catalyst by virtue of aerodynamic and electrostatic principles applying to operation of the apparatus.

The sprays from the two resin atomizers 15 form about 99 percent of the liquid material making up the mixed spray, the catalyst from atomizer 16 making up the remaining one percent. The relatively large volume of resin spray is effectively charged by the charging electrodes adjacent the resin atomizers 15. In the preferred embodiment of this invention, the smaller volume of catalyst spray is initially charged to a polarity opposite that of the resin sprays. The catalyst spray is attracted to and mixed with the resin sprays, yet, because of the small volume of catalyst spray, the catalyzed resin spray carries a net electrostatic charge which results in electrostatic deposition on the article 12.

FIG. 1 illustrates the coating of a mold surface with reinforcing fibers; however, a first coating of the mold surface can be accomplished without glass fibers. Such a coating can provide a smooth, decorative outer surface like that of a porcelain bathroom fixture. However, for subsequent coats and to obtain greater rigidity, the fiber glass cutter 26, mounted on the apparatus 13, can be operated to emit glass fibers into the commingled spray forwardly of the apparatus, or in the alternative, a distributor for air-entrained powder material could likewise be mounted above the apparatus 13 between bodies 14 and 19 to eject particulate matter into the commingled sprays. Employing such a source of glass fibers or particulate matter permits obtaining the advantages attendant to use of such materials in manufacturing such articles.

In using a cutter for glass fibers in this invention, it is preferable that the materials contacting the glass fibers 27 within the cutter 26 be selected to obtain electric charging of the cut glass fibers to improve wetting of the fibers with catalyzed resin and better control of fibers that may otherwise escape deposition on the mold surface.

For example, when glass fibers are cut in a chopper that uses a backup roller made of rubber-like polyurethane material, the cut glass fibers are ejected from the cutter with a positive charge. When one rope of standard Owens-Corning glass fibers is cut into about one-inch lengths and collected with a collector insulated from ground potential, a voltage on the order of 10,000 volts positive can be obtained after a few minutes of operation. When two such ropes are cut, this voltage is about doubled, and when three such ropes are cut, the voltage that can be obtained is further significantly increased. This voltage is due to a positive charge put onto the cut glass fibers by the cutter that is believed to be due to their frictional engagement with the rollers in the cutter, and most probably, due to slippage between the glass fibers and the polyurethane rubber-like backup roller.

Positively charged cut glass fibers are preferred when the charging electrodes are negatively charged. If the high voltage source 29 provides a negative output, the catalyzed resin spray particles will be charged negatively because of the effectiveness and association of the charging electrodes with the resin atomizers. The positively charged cut glass fibers are then attracted to the negatively charged resin spray, and negatively charged resin particles are correspondingly attracted to the positively charged cut glass fibers. This coaction reduces the number of glass fibers that escape deposition on the mold surface and increases the likelihood that the glass fibers will be wet by the catalyzed resin material, both of which are problems in the manufacture of articles with plural component materials. Furthermore, there is a reduced tendency for cut glass fibers to collect on the plural component apparatus and grounded articles in its area of operation. This is believed to be due to the ionization of the charging electrodes discharging undeposited cut glass fibers, which are generally charged by operation of cutters. Where the method and apparatus of this invention imparts a positive charge to the resin spray, it would be preferable to adjust the triboelectric charging characteristics of the cutter to impart a negative charge to glass fibers, if possible.

Use of such cut glass fibers with this method and apparatus reduces the net charge on the mixed spray reaching the mold surface and the effectiveness of electrostatic deposition of the liquid catalyzed resin spray may be somewhat reduced; however, this reduction is compensated for in many operations by the advantages set forth above. Much of the catalyzed resin spray that would be lost as overspray, however, has not contacted the cut glass fibers and the electrostatic deposition of this portion of the spray is not significantly affected.

Referring now to FIG. 2 which omits the fiber glass cutter 26, the apparatus 13 has a rear portion comprising handle 17, trigger 18 and support members 19 and 19a, which are preferably of metallic material, such as aluminum. Barrel members 20 are preferably molded with an insulating material such as Delrin, an acetal resin sold by E. I. DuPont. The metal handle 17 is secured to and depends from the rear portion of the apparatus, forming an angle on the order of 90°. The handle is connected to ground through the high voltage cable 28. The trigger 18 is pivoted on the rearwardly extending portion 19a, fastened to member 19. Hose 23 for the resin portion of the plural component material is connected to a swivel fitting 30 on a bushing 31 which extends downwardly from member 19. High voltage cable 28 enters the gun through the base of the handle. The high voltage cable includes a coaxial metallic braid surrounding the high voltage conductor that is grounded at the high voltage supply and is connected to the handle 17 of the apparatus, thereby grounding the handle.

The curing agent or catalyst material is connected to the apparatus 13 at body 14. Curing agent is delivered to body member 14 through hose 25 and a hose fitting 33.

In FIG. 2 the interior portions of the barrels 20 are shown in greater detail by a partial cross-section of apparatus 13 forwardly of support member 19 and on a plane through the center of one of the barrel members 20. The barrel members 20, preferably identical in their structure, are secured to support body 19 by threaded fasteners which engage flanges formed in the barrels 20. Barrels 20 have a rectangular cross section along a plane perpendicular to FIG. 2 and are provided with two passages. The upper passages 34 carry the high voltage connections to the electrodes 35. Insulating tube 37, preferably of polyethylene, is carried within passageways 34 and surrounds and insulates the connections between a high voltage conductor 38, which is connected with cable 28, and multimegohm resistors 39. At the forward end of the barrels, there are steps in passages 34 with the forward portions 34a of passages 34 being offset towards the lower passageways 36. Second resistors 40 are located in the offset forward passageways 34a and are connected with the forward end of resistors 39 through springs 41. The forward ends of passageways 34 are sealed by semiconductive plugs 42 carrying O-ring seals. Closure means 43 are fastened to the front ends of barrels 20 by insulating nuts 44. Closure means 43 carry wire conductors 45 in contact with semiconducting plugs 42 at the backs of closure means 43. Wire conductors 45 extend through the closure means 43 and contact semiconductive rear surfaces 46 of nozzle-electrode carriers 47. The nozzle-electrode carriers 47 are mounted on the closure means 43 by insulating nuts 48. High voltage electrostatic charge for charging electrode 35 is thus conveyed from high voltage cable 28 to cable connection 38 and through resistors 39 and 40 and connecting means 41, 42, 45 and 46 to charging electrodes 35.

The lower passageways 36 of bodies 20 are fitted with bushings 49 which extend into rear body member 19. Resin material entering body member 19 through bushing 31 is connected with the passageways 36 of the barrel members 20 by passageways within body member 19. The passages in body member 19 are sealed at the rear with packing material and threaded packing nuts. A small wire 50 passes through the packings and packing nut and is connected by means of a cross bar with trigger 18. Connected to elongated flexible valve actuators 51 are ball valve closure members 52 bearing against the valve seats 53 carried in closure members 43. Upon actuation of trigger 18, valve closure members 52 are lifted from seats 53. The resin material flows through passageways 36 and through passageways 54 in closure members 43, through tungsten carbide nozzles 55 carried by nozzle-electrode holders 47. The interfaces between nozzle-electrode holders 47 and closure members 43 are sealed by compressible seal members 56 carried by closure members 43.

Insulating bushing 37 is injection-molded in a Y configuration from a high density polyethylene insulating material with high voltage conductor 38 formed in place during the molding. The two extending portions of the Y-shaped bushing extend forwardly into insulating barrels 20 as shown above. The rearwardly extending leg (not shown) extends through rearwardly extending member 19a into handle portion 17 to form an insulating bushing around the high voltage conductor of high voltage cable 28 and its interconnection with conductor 38.

Because of the use of high voltage for the charging electrodes, everything in barrels 20 forwardly of body member 19 is of nonconducting or resistive material except for connecting elements 41 and 45 and the nozzle 55. The high voltage connection is made up of resistive or semiconductive elements, such as resistors 39 and 40, plug 42 and the semiconductive rear surface 46 of the nozzle-electrode holder. The resistance of these elements is selected in accordance with the teachings of U.S. Pat. No. 3,048,498 in order that the apparatus 13 can be operated safely.

Handle parts 19, 19a and 17 are all grounded and there are no ungrounded metallic parts in the forward portion of apparatus 13. Hose connection 33 and body member 14 are both of nonconducting material, such as Delrin, an acetal resin manufactured by E. I. DuPont, or another such structurally sound, nonconducting plastic material.

Nozzle 55, generally made of tungsten carbide, is used to effect airless atomization of the resin material which is delivered to it through the passageways of barrel 20 at high pressure, on the order of 300 to 3000 p.s.i. The nozzle is selected to provide an orifice size and shape to produce a fan-shaped spray of atomized resin material forwardly of the apparatus 13. Such nozzles have effective orifice diameters on the order of 0.007 to 0.031 inches in diameter, depending largely upon the rate of atomization of resin material to be sprayed. Since the resin materials used are frequently not pigmented, filtration of the resin material is not usually necessary; however, if necessary, a filter can be incorporated within bushing member 31.

Although FIG. 2 shows the cross-section of only one barrel 20, the other barrel 20 is identical. Identity in the structure of these two barrels is, however, not required. If, for example, the resin material is made up of two different liquid components, each of these components may be sprayed from a different barrel and each barrel may be modified to accommodate the material that it is spraying.

FIG. 3 is a top elevational view of the apparatus of FIGS. 1 and 2. As more clearly seen in FIG. 3, the forward portion of apparatus 13 is arranged to direct the resin sprays from sites spaced apart by body 14 in such a manner that they intersect forwardly of the apparatus as shown in FIG. 1.

As shown in FIG. 3, the catalyst or curing agent atomizer 16 is mounted on body 14 intermediate the spaced-apart sites of the resin atomizers 15. The means to atomize the curing agent 16 is an airless atomizer like the resin atomizers and is shown in partial cross section. A metallic needle valve 21 extends forwardly between body member 19 and forward body member 14. The metallic needle valve 21 is grounded by contact with the grounded metallic parts making up the rear of the gun. Needle valve 21 extends forwardly through packing nut 57 and packings 58, which seal the coating material passageway in body 14. A body portion 59, forming a passageway 60 for catalyst or curing agent and carrying a valve seat 65, is made of nonconducting material and fastened to body 14. O-ring 61 seals the interface between the valve holder 59 and the body 14. Mounted on the forward portion of the valve holder 59 by means of insulating nut 62 is a nozzle holder 63. The interface between the nozzle holder 63 and the valve holder 59 is sealed by a compressible seal member 64.

Upon actuation of the trigger, needle valve 21 is lifted from the valve seat 65 and catalyst material supplied to body member 14 through hose 25 from source 24 is delivered through passageway 60 (shown in phantom lines at FIG. 3) through the passageway formed in the valve holder 59 to atomizing nozzle 63. Catalyst is atomized airlessly by the hydraulic force imposed by source 24 on the catalyst material and broken into a fine spray of catalyst particles that are injected into the intersection of the resin sprays from the outermost resin atomizers.

High voltage to electrodes 35 is controlled by an electrical switch within the handle 17. As the trigger is pulled, actuating valve actuators 51 in the barrels 20 and valve actuator 21 for the catalyst, the switch within the handle is likewise actuated. High voltage power supply 29 is turned on by this switch and applies a voltage on the order of 60,000 volts D.C. to the high voltage connecting member 38. This voltage is applied through resistors 39 and 40 in each-of the barrels 20 to the two electrodes 35. The electrodes 35 form two highly ionized zones by virtue of their sharp tips and an electrostatic field to the other grounded metallic portions of the apparatus 13, and to the grounded mold surface 12. Because of the current flow from formation of the highly ionized zone, the electrode voltage is reduced by action of resistors 39 and 40 to a voltage on the order of 50,000 volts D.C.

As can be noted in FIGS. 1 and 2, electrodes 35 are adjacent the sites of atomization of the resin material. The electrostatic fields from electrode 35 extend to the article to be coated and to the grounded portion of the apparatus 13. In the preferred embodiment of this invention, parts 59, 60, 61, 62 and 64 are all constructed of nonconducting materials, such as Delrin, an acetal resin of E. I. DuPont & Company, or glass filled nylon. The forwardmost grounded members of the apparatus as shown in FIG. 3 are thus the grounded valve members 21 and 65. Valve members 21 and 65 are in contact with the liquid catalyst material. Thus the catalyst material, if it has sufficient electrical conductivity, and the valve members 21 and 65 become a terminus of the electrostatic field from electrodes 35. Because the site of atomization of the catalyst material is adjacent a terminus of the electrostatic field from the charging electrodes, catalyst particles have a tendency to be formed with a charge of opposite polarity to that imparted the resin particles by the highly ionized zone forwardly of electrodes 35. This tendency can be enhanced if the electrical conductivity of the catalyst material is adjusted by the addition of conductive solvents to a range, for example, of 0.1 to 150 megohm centimeters.

In operation, airless atomizers of the type used in the apparatus 13, form the liquid into a thin film forwardly of the nozzle. As the catalyst material is made more conductive, the thin, fan-shaped film of catalyst material forwardly of the nozzle 63 has a greater tendency to concentrate the electrostatic field from electrodes 35 at the site of formation of the catalyst spray particles.

While it is thus preferred that the catalyst be conductive and that those portions of the catalyst atomizer adjacent electrodes 35 be made of nonconductive material to enhance charging of the catalyst particles to a polarity opposite that of the resin particles, this is not necessary to obtain the benefits of this invention. If the parts making up the catalyst atomizer are grounded metallic parts, for example, if the parts 59, 60, 61, 62, 63 and 64 were formed of metal and grounded by the fluid valve member 21, these metallic parts will act as a terminus of the electrostatic field from the charging electrodes 35 and catalyst particles formed by such an atomizer intermediate the spaced-apart charging electrodes and resin atomizing sites would be attractively associated with the resin particles which pass through the highly ionized zones forwardly of electrodes 35.

For example, in the operation of this method when an apparatus like 13 is constructed having a configuration forwardly of body 14 like that shown in FIGS. 2 and 3, but having a standard industrial metallic airless atomizer for the catalyst located centrally of the spaced-apart resin atomizers and charging electrodes, with promoted polyester resin being sprayed from the outermost locations, and with methyl ethyl ketone peroxide catalyst being atomized from the grounded central airless atomizer and the mixed spray being directed at one-inch diameter, grounded metal rods spaced on three-inch centers, the percentage of catalyzed resin material deposited on the one-inch diameter targets was doubled when voltage on the order or 60,000 volts D.C, was applied through resistance on the order of 300 megohms to wirelike electrodes 35 having a diameter of about 0.020 inches, compared to the same conditions without voltage applied. The methyl ethyl ketone peroxide catalyst was conductive and good mixing of the resin and catalyst occurred. When the same apparatus was operated without catalyst being sprayed, but with voltage applied to the outer electrodes and with resin being sprayed, the percentage of uncatalyzed resin which was deposited upon the articles being coated was approximately 10 percent less than in the first example, but still 80 percent higher than without voltage applied. The voltage applied to the charging electrodes was negative in polarity with respect to ground potential; however, positive electrical polarity may also be used.

Figure 4:
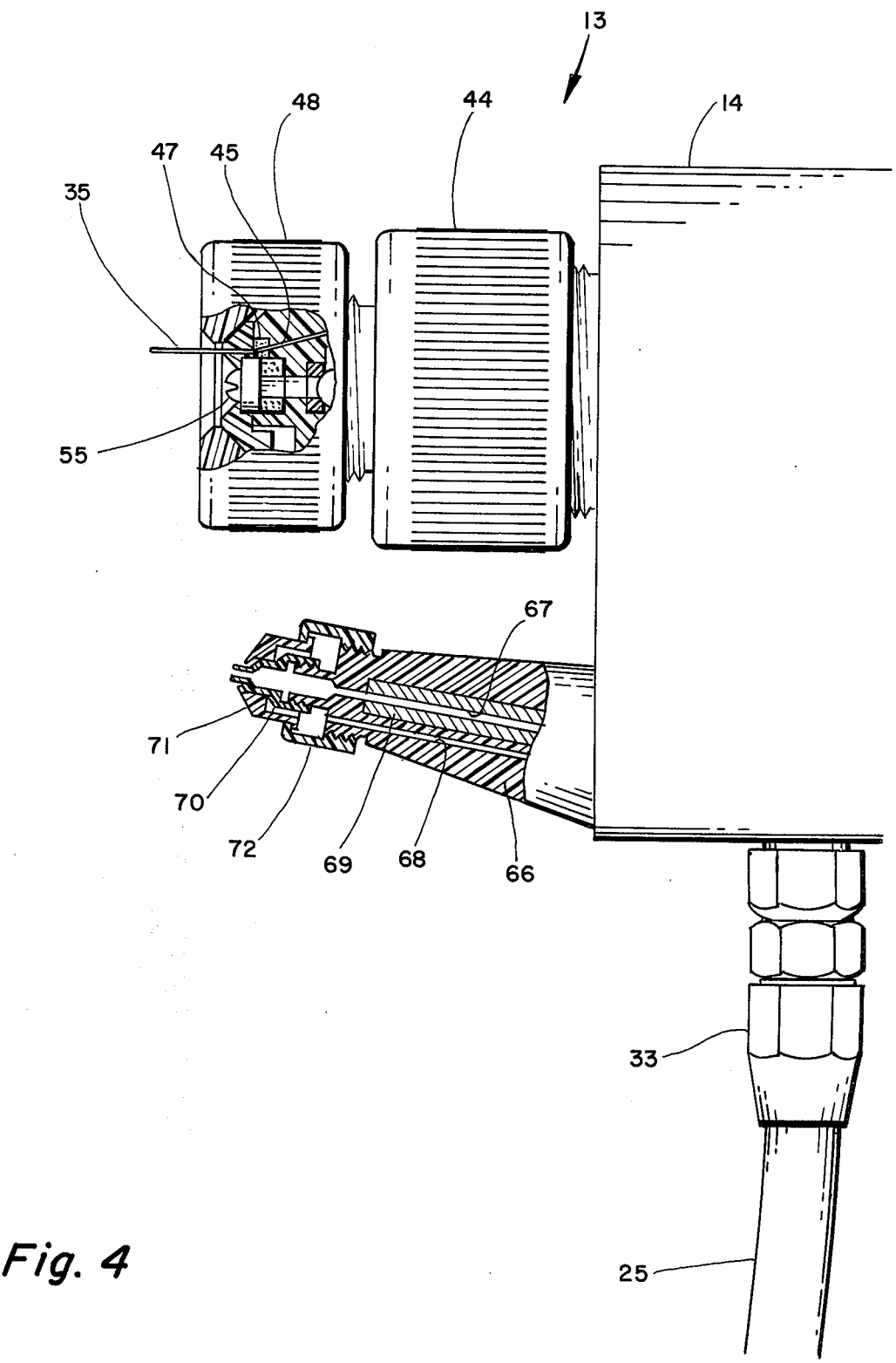
FIG. 4 is a partial view of an embodiment of my invention utilizing two atomizers, both of which are shown in greater detail by partial cross-sectional views.

FIG. 4 shows the forwardmost portion of apparatus embodying the invention which includes two atomizers. The FIG. 4 embodiment includes one airless atomizer for the resin just like those shown in the FIGS. 1–3 embodiments. The embodiment of FIG. 4 includes a single electrode 35, preferably a wire about 0.020 inches in diameter, mounted adjacent the airless means to atomize resin material. Although it is not shown, a single insulating barrel member 20 like those shown in FIG. 2 extends rearwardly from the body 14 shown in FIG. 4, where it is connected to a grounded handle and rear support member. Unlike the apparatus of FIGS. 1–3, the apparatus of FIG. 4 includes a compressed air catalyst atomizer spaced below the airless resin atomizer on body 14. Although the embodiment of FIG. 4 does not use the spraying of catalyst material between two converging resin sprays, the atomized catalyst material is drawn into and mixed with the resin material by the combined action of electrostatic attraction and the air flows created by the atomizers.

In the embodiment illustrated in FIG. 4, the compressed air atomizer includes a support member 66 mounted on and extending forwardly of body 14. The support member includes passages 67 and 68 for catalyst material and compressed air, respectively. A grounded metallic member 69 is carried within the coating material passage of the support member 66. Member 69 is grounded within the hose connection 33 and hose 25 leading to the grounded source of catalyst 24. Mounted on the front of support member 66 are a fluid nozzle 70 and an associated compressed air cap 71 retained in place by threaded retainer 72. With the exception of the grounded conductive sleeve 69 within the coating material passageway 67, the entire compressed air atomizer, comprising parts 66, 70, 71 and 72, is made of a nonconducting material, such as Delrin.

The method of this invention is practiced by the FIG. 4 embodiment just as it is with the embodiments shown in FIGS. 1–3. Upon actuation of a trigger on a grounded metallic handle portion rearwardly of the forward portion of the apparatus shown in FIG. 4, the valves controlling the flow of resin material and catalyst material to the atomizers of FIG. 4 are opened, resin material is supplied to nozzle 55 under high pressure, on the order of 300–3000 pounds per square inch for example. By the action of the nozzle 55, the resin material is ejected through nozzle 55 at very high velocity as a thin, expanding fan-shaped film, viewed on edge in FIG. 4. The highly moving and expanding film of resin reacts with the relatively quiescent air forwardly of the airless atomizer and breaks into a fine spray of resin particles.

Liquid catalyst is pumped through passageway 67 and a fluid nozzle to the orifice at its forwardmost portion at relatively low pressure on the order of 1–30 p.s.i. Compressed air at, for example, a pressure of 5–50 p.s.i., simultaneously flows through passageway 68 and the passageways formed between the fluid nozzle 70 and the air cap 71 to an annulus surrounding the orifice of fluid nozzle 70. Liquid coating material flows from the oridice where it is broken into particles under the influence of the compressed air flowing through the annulus surrounding the fluid orifice. The liquid catalyst material is in contact with the grounded sleeve 69, which is the forwardmost grounded portion of the apparatus and acts as a terminus for a portion of the electrostatic field from the charging electrode 35. Atomization of the catalyst material forwardly of the compressed air atomizer thus occurs adjacent a terminus of the electrostatic field, and catalyst particles have a tendency to be formed with a polarity that is relatively opposite to that imparted the resin spray particles. The tendency of catalyst particles to carry such charge can ge enhanced if the catalyst material is electrically conductive. For example, catalyst material having an electrical resistivity less thana 100 megohm-centimeters, and preferably as low as possible, will act as a terminus of a portion of the electrostatic field from charging electrode 35 at the orifice of fluid nozzle 70, and the catalyst spray particles formed will be formed with a greater charge opposite to that of the resin spray.

In this embodiment, as in the embodiments of FIGS. 2 and 3, a voltage of 60,000 volts D.C. negative is applied to the apparatus. In operation the electrode voltage is significantly lower because of the electrical current associated with ionization from the charging electrode 35. Because of the close association of the grounded member 69, or the grounded catalyst stream, electrostatic field adjacent electrode 35 is increased in intensity. In any event, a single highly ionized zone of ions is formed adjacent electrode 35. The electrode 35 is so located with respect to the first atomizer for resin and the second atomizer for catalyst that a line from adjacent the electrode tip to the second atomizer intersects the resin material emitted from the first atomizer. Acting under the influence of electrostatic field from the charging electrode 35 to adjacent the catalyst atomizer, the ions from the single highly ionized zone move transversely of the path of spray particles from nozzle 55. This configuration places the ions and the resin material on a collision path and enhances the opportunity for resin particles to become highly charged by collision with the ions and further, reduces the number of ions reaching the catalyst material emitted from the second atomizer.

Thus, with the method of this invention, plural component structures can be formed with electrostatic deposition of the plural component materials. In this invention the resinous component of the plural component materials is formed into a spray at one site and, an electrostatic field is established from a charging electrode adjacent the site of formation of resinous material to charge the resin spray with one polarity. A curing agent or catalyst material for the resinous material is simultaneously formed into the spray at another site, maintained at an electrical polarity such that it will act as a terminus of the electrostatic field from the charging electrode, and preferably grounded. With site of formation of the catalyst material acting as a terminus for the electrostatic field from the charging electrodes, the catalyst spray may be charged to be attracted to the resin spray. The sprays are projected from their relative sites of formation and converge and mix and are directed for electrostatic deposition on the substrate on which the plural component structure is to be formed.

Because the resinous material is sprayed in high volume, approximately 99 percent of the total liquid material leaving the apparatus, and at least twenty times the rate of spray of the curing agent, and because the resinous spray is highly charged by the adjacent charging electrode 35, the resulting spray mixture of catalyzed resin material has a net charge which makes it effectively deposited by the electrostatic field from the charging electrode to the grounded substrate. The relatively low volume of catalyst spray, on the order of one percent, which is less charged than the resin spray, reduces the net charge of the mixed spray but not significantly with respect to the effectiveness of the electrostatic deposition. As noted before, using a method of this invention, the percentage of plural component spray which may be deposited upon a substrate, such as one-inch metal rods on 3-inch centers, may be doubled.

Both the apparatus of FIG. 4 and the apparatus of FIGS. 1–3 include a first means to atomize and form a spray of resin material and a second means to atomize and form a spray of catalyst material. A third means creates an electrostatic field from adjacent the first means to adjacent the second means and to the substrate. This arrangement charges the spray and the resin to enhance their mixing and deposition on the substrate. More specifically, a body carries the first atomizer connected with a source of resin material and a second atomizer connected with a source of catalyst material. A charging electrode comprising the third means is carried by the body adjacent the first and second atomizers and connected with the output of a high voltage source. A portion of the second atomizer and the high voltage source are connected to a common ground. The catalyst atomizer may be formed from nonconductive material, and the liquid catalyst should be formed by the atomizer, where it is exposed to the electrostatic field from the charging electrode, into a shape which is effective as an electrode terminus of this electrostatic field. Such an effective shape would be a thin stream, like a cylinder of small diameter such as that formed by the orifice of the fluid nozzle shown in FIG. 4, or a thin, flat, fan-shaped film of liquid such as that obtained by the airless atomizer of FIGS. 1–3.

In practicing the method with apparatus having nonconductive catalyst atomizers, it may be necessary and advisable to increase the electrical conductivity of the catalyst material by the addition of conductive solvents to an electrical resistivity of less than 100 megohm-centimeters as noted above; however, in using the invention with polyester resins, one of the most common plural component materials used in forming structures, the methyl ethyl ketone peroxide that is used as a catalyst is sufficiently conductive in an undiluted state or, as frequently used, when diluted with ethyl acetate.

The method and apparatus of this invention can be practiced upon a substrate of nonconducting material. In this method the resin and catalyst are adjusted to provide the electrical conductivity in the deposited liquid film. The degree of electrical conductivity needed is dependent upon the size of the surface to be painted, but it must be such that when deposited as a liquid film on the substrate, the effective resistance through the deposited liquid film to a grounded portion of the substrate from any point on the surface should be maintained below $2 \times 10^3$ megohms. In order to achieve this, the resistivity of the liquid film should be below $10^9$ ohms per square (a unit of surface resistivity determined by measuring the resistance between any two opposite sides of a square of the material making up the surface). Generally speaking, the lower the resistivity of the liquid material making up the coating, the larger the surface which can be coated, thus it is preferable that the resistivity of the surface on the order of $10^7$ ohms per square or lower. In the coating thicknesses normally laid down, such conductivity can be achieved with catalyzed resin solutions having an electrical conductivity of less than 100 megohm-centimeters. For example, a polyester resin manufactured by The Reichhold Chemical Company of Detroit, Mich., their 33-072, has a bulk resistivity of about 400 megohm-centimeters. Its electrical resistivity (or conductivity) can be adjusted by the addition of solvent materials such as acetone and methyl ethyl ketone and by the addition of conductive additives, such as one obtained from Cal Research Corp. of San Francisco, Cal., their No. 202. Use of these materials produces the following reduction of electrical resistivity of the diluted liquid resin:

| Grams of Resin | Solvent or Additive | Percentage by Weight of Solvent or Additive | Resistivity Megohm-Centimeters |
|---|---|---|---|
| 540 | — | — | 400 |
| 537 | MEK | 1 % | 400 |
| 547 | MEK | 5 % | 90 |
| 559 | MEK | 10 % | 55 |
| 539 | Acetone | 1 % | 370 |
| 543 | Acetone | 5 % | 85 |
| 547 | Acetone | 10 % | 40 |
| 544 | Additive No. 202 | 2.5 % | 90 |

Typically, the electrical resistivity of such resins are adjusted to about 60 megohm-centimeters in this method.

Thus, adjusting the electrical conductivity of the resin and catalyst not only produces more effective charging and higher deposition efficiencies, it also permits use of this method and apparatus on nonconducting substrates or molds.

The foregoing description sets forth several embodiments of the method and apparatus of this invention. Other embodiments, however, fall within the scope of this invention as claimed.

I claim:

1. A method of forming a structure from plural component material with electrostatic deposition comprising
   forming a promoted resinous material into a spray at one site;
   establishing an electrostatic field from a charging electrode adjacent the site of formation of the spray of resinous material to charge the spray with one polarity;
   simultaneously forming a catalyst material for said resinous material into a spray at another and grounded site adjacent the charging electrode, and charging said catalyst spray to the opposite polarity from said promoted resin, the site of formation of the spray of catalyst material acting as a terminous of the electrostatic field from said charging electrode; and
   projecting the sprays from said sites of formation so that they converge and mix, the volume of said sprayed resin being greater than that of said catalyst material whereby said spray of mixed promoted resin and catalyst retains a net charge of said one polarity, and are directed for electrostatic deposition on a surface maintained at a spray-attracting potential on which the structure is to be formed.

2. The method of claim 1 wherein said electrostatic field adjacent the charging electrode creates a highly ionized zone of ions, and said grounded site of formation of catalyst material attracts ions from said highly ionized zone so that they collide with the spray of promoted resinous material, said ions being substantially entirely carried away by the spray of promoted resinous material.

3. The method of claim 1 including the step of forming promoted resinous material into a second spray at a second site more remote from the site of formation of the first spray than from the grounded site of formation of catalyst material and establishing an electrostatic field from a charging electrode adjacent said second site to charge the second spray of resinous material.

4. The method of claim 3 wherein said site of formation of said first spray of resinous material and said second site of formation of said second spray of resinous material have between them said grounded site of formation of catalyst material into a spray.

5. A method of forming a structure of plural component material comprising
   forming a spray of an amount of resin and electrostatically charging the spray to one electrical polarity adjacent one terminus of an electrostatic field;
   forming a spray of an amount of catalyst material for said resin and electrostatically charging said catalyst material to the other polarity adjacent an opposite terminus of the electrostatic field;
   said amount of catalyst being less than said amount of resin;
   projecting the charged spray of resin material and the charged spray of catalyst material so said sprays converge and mix, retaining a net charge, and are deposited electrostatically at the site of formation of the structure;
   the mixed catalyst and resin curing to form said plural component structure.

6. The method of claim 5 including the step of cutting a fibrous insulating material into lengths on the order of one inch or less, triboelectrically charging said cut fibers and projecting said charged, cut fibers into the sprays of resin and catalyst material.

7. The method of claim 5 wherein the spray of resin contains at least twenty times as much material as the spray of catalyst.

8. The method of claim 7 wherein the resin is cobalt naphthenate promoted polyester resin and the catalyst is methyl ethyl ketone peroxide.

9. A method of electrostatically depositing plural component material on a mold of electrically nonconductive material comprising
adjusting the electrical conductivity of a resin material to less than 100 megohm-centimeters;
forming a spray of an amount of conductive resin and electrostatically charging the spray;
forming a spray of an amount of catalyst;
said amount of catalyst being less than said amount of resin;
projecting the charged spray of resin material and the spray of catalyst material so said sprays converge and mix to form a charged composite spray composed of conductive resin and catalyst material;
providing the mold with a ground connection; and
directing the charged composite spray of conductive resin and catalyst at said ground connection on said mold to form a conductive liquid layer of resin and catalyst and proceeding to direct said charged composite spray at the edge of said layer until the entire mold is coated.

10. A method of forming a structure from liquid material including a liquid resin and a curing agent for said resin, which, when mixed with the said resin, converts the mixture from liquid to solid phase comprising
adjusting the electrical conductivity of the curing agent to an electrical resistivity of less than 100 megohm-centimeters;
delivering the liquid resin to a first site of atomization and atomizing the liquid resin to form a spray;
delivering the conductive curing agent to a second site of atomization and forming the electrically conductive liquid curing agent at said second site of atomization into a thin stream and atomizing the liquid curing agent to form a spray;
creating an electrostatic field from a site adjacent the first site of atomization of resin and maintaining the thin stream of conducting catalyst as a terminus of lines of force of the electrostatic field to charge a spray of resin material to one polarity and to form the particles at the second site of atomization with a charge of a polarity by which they are attracted to a spray of resin material and directing the spray of resin and the spray of curing agent so that the sprays mix and are deposited on a mold surface and cure thereon to form said structure.

11. The method of claim 10 wherein said resin material is atomized at a rate of at least twenty times the rate of atomization of the curing agent material.

12. The method of claim 10 wherein the electrostatic field creates a highly ionized zone of ions, and said ions acting in response to the electrostatic field, are attracted toward the thin stream of conductive liquid curing agent and traverse the spray of resin material.

13. The method as set forth in claim 10 wherein the electrical conductivity of the resin material is adjusted to an electrical resistivity of less than 100 megohm-centimeters and the sprays are directed to an electrically nonconductive mold surface which has a conductive portion maintained at ground potential, the sprays being directed to apply a liquid film at the grounded conductive portion first and then directed in such a manner that the entire mold is coated while maintaining a liquid film between the grounded conductive portion of the mold surface and the point of application of the plural component material.

* * * * *